(12) United States Patent
Ortega et al.

(10) Patent No.: US 9,992,081 B2
(45) Date of Patent: Jun. 5, 2018

(54) SCALABLE GENERATION OF INTER-AUTONOMOUS SYSTEM TRAFFIC RELATIONS

(71) Applicant: Cisco Technology, Inc., San Jose, CA (US)

(72) Inventors: Claudio Alberto Ortega, Redwood City, CA (US); Paolo Lucente, Amsterdam (NL); Katankotan Sreejith, Bangalore (IN); Honsogae Sathyanarayana Sri Harsha, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 343 days.

(21) Appl. No.: 14/804,636

(22) Filed: Jul. 21, 2015

(65) Prior Publication Data

US 2016/0366035 A1 Dec. 15, 2016

(30) Foreign Application Priority Data

Jun. 9, 2015 (IN) .......................... 2204/MUM/2015

(51) Int. Cl.
*H04L 12/26* (2006.01)

(52) U.S. Cl.
CPC ............ *H04L 43/026* (2013.01); *H04L 43/04* (2013.01)

(58) Field of Classification Search
CPC .................................................... H04L 43/026
See application file for complete search history.

(56) References Cited

U.S. PATENT DOCUMENTS 7,581,022 B1 * 8/2009 Griffin .................... H04L 45/04
370/238
7,636,305 B1 * 12/2009 Taylor ................. H04L 63/1416
370/230

(Continued)

OTHER PUBLICATIONS

Claise, Benoit, Brian Trammell, and Paul Aitken. Specification of the IP flow information export (IPFIX) protocol for the exchange of flow information. No. RFC 7011. 2013.*

(Continued)

*Primary Examiner* — Jimmy H Tran
(74) *Attorney, Agent, or Firm* — Ronald Fernando (57) ABSTRACT

In one embodiment, a method includes: obtaining network flow information from devices in a network, where the network flow information from a respective device of the plurality of devices corresponds to one or more data flows that traverse the respective device; and producing network flow sub-files according to specified network flow characteristics that characterize a first key space using the network flow information, where the specified network flow characteristics satisfy one or more performance criteria. The method also includes: generating inter-autonomous system (inter-AS) traffic sub-files by converting the network flow sub-files to a second key space, where each of the inter-AS traffic sub-files includes one or more inter-AS flows that characterize data traffic between at least two external AS's that traverses the network; and generating an inter-AS traffic file based on the plurality of inter-AS-traffic sub-files in order to monitor traffic traversing network.

20 Claims, 8 Drawing Sheets

(56) References Cited

U.S. PATENT DOCUMENTS

| | | | | |
|---|---|---|---|---|
| 7,852,772 | B2* | 12/2010 | Filsfils | H04L 45/00 370/238 |
| 7,904,586 | B1* | 3/2011 | Griffin | H04L 45/00 709/238 |
| 7,995,477 | B2* | 8/2011 | Atkins | H04L 43/026 370/235 |
| 8,027,245 | B2* | 9/2011 | Kodialam | H04L 45/04 370/216 |
| 8,130,767 | B2* | 3/2012 | Aitken | H04L 47/10 370/401 |
| 8,194,535 | B2* | 6/2012 | Kodialam | H04L 45/04 370/217 |
| 9,065,767 | B2* | 6/2015 | Dong | H04L 47/38 |
| 9,083,633 | B2* | 7/2015 | Cantu' | H04L 47/18 |
| 9,258,238 | B2* | 2/2016 | Bahadur | H04L 47/125 |
| 9,413,634 | B2* | 8/2016 | Nadeau | H04L 45/124 |
| 9,705,815 | B2* | 7/2017 | Mattson | H04L 47/70 |
| 2003/0200463 | A1* | 10/2003 | McCabe | H04L 63/0218 726/11 |
| 2005/0265255 | A1* | 12/2005 | Kodialam | H04L 45/04 370/252 |
| 2006/0285495 | A1* | 12/2006 | Aitken | H04L 47/10 370/235 |
| 2007/0091796 | A1* | 4/2007 | Filsfils | H04L 45/00 370/228 |
| 2008/0279111 | A1* | 11/2008 | Atkins | H04L 43/026 370/252 |
| 2010/0169719 | A1* | 7/2010 | Carruzzo | H04L 43/026 714/49 |
| 2013/0262703 | A1* | 10/2013 | Dong | H04L 47/38 709/247 |
| 2013/0283365 | A1* | 10/2013 | Mccabe | H04L 63/0218 726/13 |
| 2014/0219086 | A1* | 8/2014 | Cantu' | H04L 47/18 370/231 |
| 2015/0063802 | A1* | 3/2015 | Bahadur | H04L 47/125 398/49 |
| 2015/0200838 | A1* | 7/2015 | Nadeau | H04L 45/124 398/58 |
| 2015/0381515 | A1* | 12/2015 | Mattson | H04L 41/145 707/609 |

OTHER PUBLICATIONS

Bilge, Leyla, et al. "Disclosure: detecting botnet command and control servers through large-scale netflow analysis." Proceedings of the 28th Annual Computer Security Applications Conference. ACM, 2012.*

Lakkaraju, Kiran, William Yurcik, and Adam J. Lee. "NVisionIP: netflow visualizations of system state for security situational awareness."Proceedings of the 2004 ACM workshop on Visualization and data mining for computer security. ACM, 2004.*

Villani, Antonio, et al. "Obsidian: a scalable and efficient framework for NetFlow obfuscation." Computer Communications Workshops (INFOCOM Wkshps), 2013 IEEE Conference on. IEEE, 2013.*

Curtis, Andrew R., et al. "DevoFlow: Scaling flow management for high-performance networks." ACM SIGCOMM Computer Communication Review41.4 (2011): 254-265.*

Cisco Systems, Inc., "Introduction to Cisco IOS NetFlow," White Paper, May 2012, 16 pages.

Fang, et al., "Inter-AS traffic patterns and their implications," Global Telecommunications Conference, 1999, vol. 3, pp. 1859-1868.

Cisco Systems, Inc., "Cisco NetFlow Collector 6.0," Datasheet, 2008, 4 pages.

Cisco Systems, Inc., "Cisco IOS NetFlow Overview," Presentation, Feb. 2004, 26 pages.

* cited by examiner

Network Flow Record 300 →

| 302 | 304 | 306 | 308 | 310 | 312 | 314 | 316 | 318 | 320 | 322 | 324 |
|---|---|---|---|---|---|---|---|---|---|---|---|
| Source AS | Ingress Interface IP Address | Ingress Interface Index | Ingress Interface IP Address | Egress Interface Index | Dest. AS | AS Path | TOS | Protocol | Sampling Rate | Packets | Bytes |

FIG. 3B

Network Flow Record 350 →

| 352 | 354 | 356 | 358 | 360 | 362 | 364 | 366 | 368 | 370 | 372 |
|---|---|---|---|---|---|---|---|---|---|---|
| Source AS | Ingress Neighbor AS | Ingress Node | Ingress Interface | Egress Node | Egress Interface | Egress Neighbor AS | Dest. AS | AS Path | Protocol | Traffic |

SCALABLE GENERATION OF INTER-AUTONOMOUS SYSTEM TRAFFIC RELATIONS

RELATED APPLICATION(S)

This application claims the benefit of Indian Patent Application No. 2204/MUM/2015, filed on Jun. 9, 2015, the disclosure of which is hereby expressly incorporated by reference in its entirety.

TECHNICAL FIELD

The present disclosure generally relates to network traffic management, and in particular, to systems, methods, and devices enabling scalable network traffic management.

BACKGROUND

Network flow information (sometimes also referred to as Netflow) provides an indication of packet traffic traversing a particular interface or network device. This level of granularity is useful for some network management techniques such as interface utilization analysis or interface traffic monitoring. However, the network flow information fails to provide an indication of the amount of traffic traversing a subject network at a macro-level. The network flow information also fails to identify traffic patterns between external autonomous systems (AS's) that pass through the subject network.

Using previously known solutions, in order to provide macro-level inter-AS traffic relations, the network flow information for a window of time (e.g., on the order of approximately $20 \times 10^6$ data flows) is converted into inter-autonomous system (inter-AS) traffic information (e.g., on the order of approximately $3 \times 10^6$ inter-AS flows) using knowledge of the subject network and also knowledge of the external AS's connected to the subject network. The inter-AS traffic information characterizes data traffic between at least two external AS's that traverses the subject network.

A great amount of memory is used to store intermediate versions of the inter-AS traffic information while the network flow information is being processed. As the subject network grows so does the amount of network flow information collected from the subject network. In turn, the input for the conversion process grows thereby increasing the amount of memory used to produce the inter-AS traffic information, and as a result, the cost of the network management servers.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for producing scalable inter-autonomous system (inter-AS) traffic relations. For example, in some implementations, a method includes: obtaining, at a network controller, network flow information from a plurality of devices (e.g., border routers) in a network, where the network flow information from a respective device of the plurality of devices corresponds to one or more data flows (e.g., IP flows) that traverse the respective device; and producing a plurality of network flow sub-files according to one or more specified network flow characteristics (e.g., a tuple defined by {interface IP address, interface index}) that characterize a first key space using the network flow information, where the one or more specified network flow characteristics satisfy one or more performance criteria. The method also includes: generating a plurality of inter-autonomous system (inter-AS) traffic sub-files by converting the plurality of network flow sub-files to a second key space distinct from the first key space, where each of the plurality of inter-AS traffic sub-files includes one or more inter-AS flows that characterize data traffic between at least two external AS's that traverses the network; and generating an inter-AS traffic file based on the plurality of inter-AS-traffic sub-files in order to monitor traffic that traverses the network.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

EXAMPLE EMBODIMENTS

Previously available network traffic analysis systems for producing inter-AS traffic information fail to scale as the amount of network flow information for a subject network increases. For example, a denial-of-service (DoS) attack on a subject network produces approximately $200 \times 10^6$ data flows of network flow information in a short period of time. Inter-AS traffic information associated with the DoS attack is useful when performing security forensic analysis. However, in this example, a typical amount of memory employed by the network traffic analysis system to convert the network flow information to inter-AS traffic information is insufficient to handle the swell in network flow information. Thus, the memory used to process the network flow information is the bottleneck with previously available network traffic analysis systems.

By contrast, various implementations disclosed herein mitigate the aforementioned memory bottleneck by providing scalable generation of inter-AS traffic information. For example, in some implementations, the network traffic information is divided into a plurality of network flow sub-files according to one or more specified network flow characteristics (e.g., a tuple defined by {interface IP address, interface index}) that satisfy one or more performance criteria in order to reduce the memory used when converting the network flow information into inter-AS traffic information.

Figure 1:
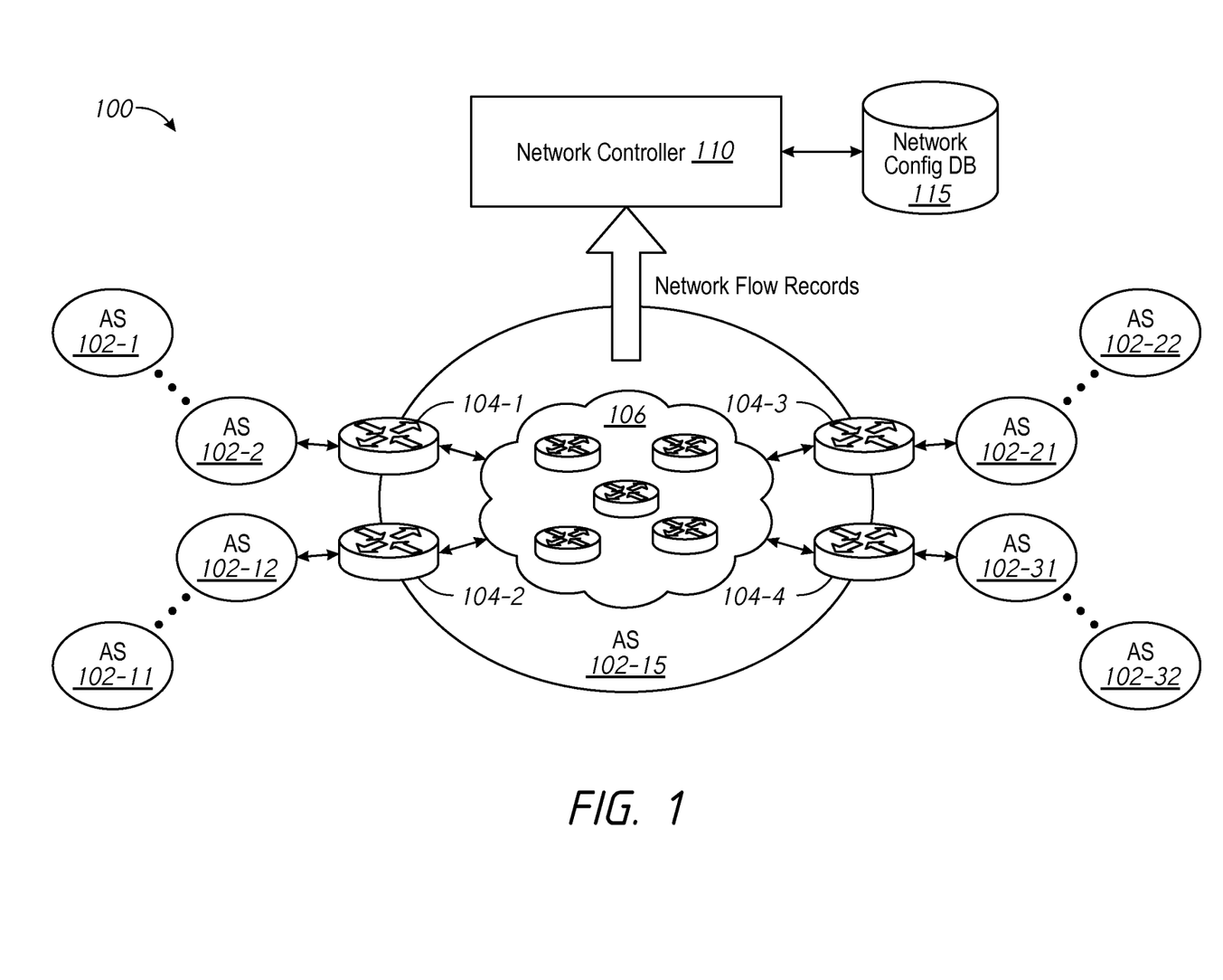
FIG. 1 is a block diagram of an example topology of a data network environment in accordance with some implementations.

FIG. 1 is a block diagram of an example topology of a data network environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data network environment 100 includes a plurality of autonomous systems 102, a network controller 110, and a network configuration database 115. In accordance with some implementations, an autonomous system (AS) refers to a group of routers within a network that are subject to common administration and a same interior gateway protocol (IGP) such as the routing information protocol (RIP), the interior gateway routing protocol (IGRP), the enhanced interior gateway routing protocol (EIGRP), the open shorted path first (OSPF) protocol, intermediate system to intermediate system (IS-IS) protocol, or the like. In some implementations, those of ordinary skill in the art will appreciate from the present disclosure that the data network environment 100 includes an arbitrary number of AS's.

As shown in FIG. 1, AS 102-15 (sometimes also herein referred to as the "customer network" or the "monitored network") includes a plurality of border routers 104-1, 104-2, 104-3, and 104-4 configured to connect the AS 102-15 with other AS's. For example, the border routers 104 communicate with AS's that are external to the AS 102-15 via an exterior gateway protocol (EGP) such as the border gateway protocol (BGP). The border routers 104 are also connected to a plurality of intra-AS routers 106 within the AS 102-15. Intra-AS routers 106 broadly represent any element of network infrastructure that is configured to switch or forward data packets according to a routing protocol or switching protocol. In some implementations, the intra-AS routers 106 comprise a router, switch, bridge, hub, gateway, etc. In some implementations, those of ordinary skill in the art will appreciate from the present disclosure that the AS 102-15 includes an arbitrary number of border routers 104 and an arbitrary number of intra-AS routers 106.

In some implementations, at least some of the nodes within the AS 102-15, such as the border routers 104 or at least some of the intra-AS routers 106, are configured to collect network flow information for data flows (e.g., flows of Internet protocol (IP) packets) that traverse the nodes. According to some implementations, a data flow is a unidirectional sequence of packets that pass through a network device with some common characteristics. In other implementations, a data flow is a bidirectional sequence of packets that pass through a network device with some common characteristic To collect network flow information, each node must process each packet (e.g., IP packet) that traverses it. In various implementations, routers and/or switches are enabled to collect network flow information, for example, by monitoring and tracking for various fields within packets. In some implementations, the characteristics (sometimes also herein referred to as "key fields" or "sub-keys") defining a data flow include, but are not limited to: ingress interface IP address, egress interface IP address, ingress interface index, egress interface index, protocol, and/or type-of-service (TOS).

In some implementations, the nodes maintain flow entries within a flow table or cache for different data flows (i.e., data flows with differing characteristics). In some implementations, network flow information from the flow entries is aggregated and formatted into one or more flow records. In some implementations, a flow record includes characteristics (e.g., the "key fields" or "sub-keys") of the data flow and also statistical information. For example, the statistical information includes the total number of bytes for all packets in the data flow, the total number of packets in the data flow, the start and/or stop time for the data flow, etc. In some implementations, the nodes periodically export flow records to the network controller 110. In some implementations, the network controller 110 periodically retrieves flow records from the nodes. For example, the network controller 110 retrieves flow records from the nodes every Y minutes (e.g., Y=20).

In some implementations, the network flow information enables customer applications associated with the monitored network (e.g., the AS 102-15) including network monitoring, application monitoring and profiling, user monitoring and profiling, network planning, security analysis, accounting/billing, and network flow data warehousing and mining. In some implementations, the network flow information enables near real time network monitoring capabilities. In various implementations, flow-based analysis techniques are utilized to visualize traffic patterns to provide proactive problem detection, efficient troubleshooting, and rapid problem resolution. To that end, in some implementations, the network flow information enables the operator of the AS 102-15 to gain a detailed, time-based, view of application usage over the network. In some implementations, the network flow information enables network engineers to gain detailed understanding of customer/user utilization of network and application resources, permitting them to efficiently plan and allocate access, backbone and application resources as well as to detect and resolve potential security and policy violations. As such, in some implementations, the network flow information facilitates a reduction of the cost of network operations while maximizing network performance, capacity, and reliability.

In some implementations, flow records are maintained on an interface-by-interface basis. As one example, the number of interfaces in the AS 102-15 is $3\times10^3$ to $30\times10^3$. In some implementations, the network controller 110 accumulates flow records until the network flow information satisfies an accumulation criterion. For example, the number of flow records that are accumulated by the network controller 110 is between $20\times10^6$ and $200\times10^6$ flow records. In some implementations, the network controller 110 uses information from the network configuration database 115 to convert the flow records into inter-AS traffic records. The process by which the flow records are converted into inter-AS traffic records is described in detail with reference to block 4-3 of FIG. 4.

In some implementations, the network configuration database 115 stores internal information corresponding to the AS 102-15 (e.g., acquired via the simple network management protocol (SNMP) or another protocol) such as interface names, IP addresses used by the interfaces, routers names, and topology. In some implementations, the network configuration database 115 also stores external information corresponds to external AS's (e.g., acquired via BGP or another protocol) such as the topology of the external AS's connected to the AS 102-15 and IP addresses of at least some of the external AS's connected to the AS 102-15.

Figure 2:
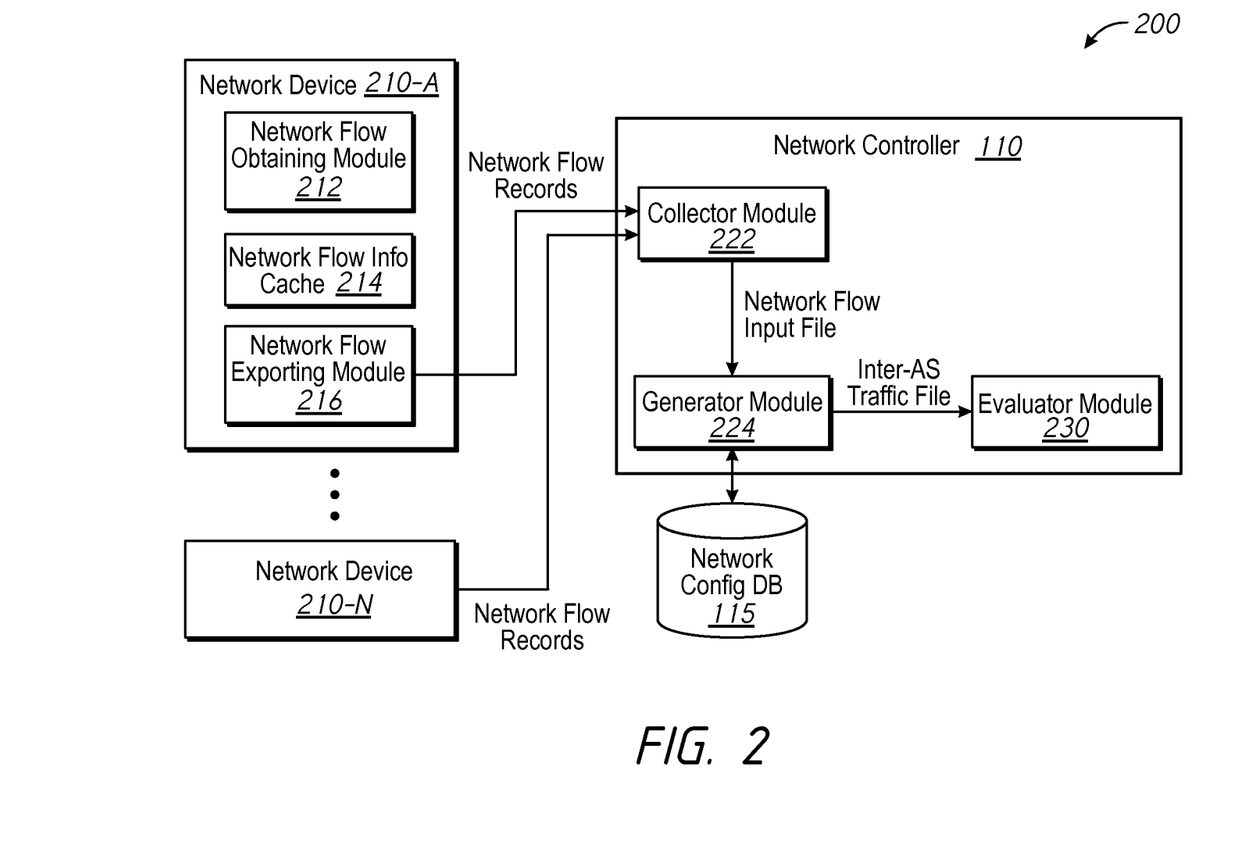
FIG. 2 is a block diagram of a data processing environment in accordance with some implementations.

FIG. 2 is a block diagram of a data processing environment 200 in accordance with some implementations. The data processing environment 200 shown in FIG. 2 is similar to and adapted from the data network environment 100 shown in FIG. 1. Elements common to FIGS. 1 and 2 include common reference numbers, and only the differences between FIGS. 1 and 2 are described herein for the sake of brevity. To that end, the data processing environment 200 includes a plurality of network devices 210-A, ..., 210-N and a network controller 110.

In some implementations, the network controller 110 includes a collector module 222, a generator module 224, and an evaluator module 230, the function and operation of which are described in greater detail below with reference to FIGS. 4 and 5. In some implementations, representative network device 210-A includes a network flow obtaining module 212, a network flow information cache 214, and a network flow exporting module 216. For example, the network devices 210-A, ..., 210-N correspond to border routers 104 in FIG. 1. In another example, the network devices 210-A, ..., 210-N correspond to border routers 104 and at least some of the intra-AS routers 106 within the AS 102-15 in FIG. 1.

In some implementations, the network flow obtaining module 212 is configured to collect network flow information by inspecting packets for data flows that traverse the network device 210-A and maintaining flow entries in the network flow information cache 214. If the characteristics of a packet correspond to an existing flow entry in the network flow information cache 214 for an active data flow or a previously recorded data flow, one or more fields of the existing flow entry (e.g., total bytes and total packets) are incremented. If the characteristics of the packet do not correspond to an existing flow entry in the network flow information cache 214, a new flow entry is created in the network flow information cache 214. For example, the packet corresponds to an existing flow entry if the packet shares a set of characteristics with the active or previously recorded data flow.

In some implementations, the set of characteristics includes key fields or sub-keys in a first key space corresponding to a data flow such as ingress interface IP address, egress interface IP address, ingress interface index, egress interface index, protocol, TOS, etc. In some implementations, the network flow obtaining module 212 also maintains start and stop times for data flows and performs other traffic monitoring activities. Although data flows (e.g., flows of IP packets) have been described in detail here, in various implementations, the network flow obtaining module 212 monitors and collects information on any type of data or packet traffic.

In some implementations, the network flow information cache 214 is configured to store a plurality of flow entries corresponding to data flows that traversed or are traversing the network device 210-A. In some implementations, the network flow obtaining module 212 aggregates flow entries with a shared set of characteristics and formats them into flow records. In some implementations, a flow record contains the characteristics (e.g., the "key fields" or "sub-keys") of the data flow and also statistical information such as the total number of bytes for all packets in the data flow, the total number of packets in the data flow, the start and/or stop time for the data flow, etc.

In some implementations, the network flow exporting module 216 is configured to periodically export flow records to the network controller 110. For example, the nodes export flow records to the network controller 110 every X minutes (e.g., X=15). In another example, the nodes export a flow record when a data flow is terminated, when a data flow has existed for a threshold amount of time (e.g., 30 minutes), or the like. For example, the flow records are exported using the user datagram protocol (UDP), the stream control transmission protocol (SCTP), or as a file. In some implementations, the network flow exporting module 216 is configured to respond to queries from network controller 110 for flow records.

Figure 3A:
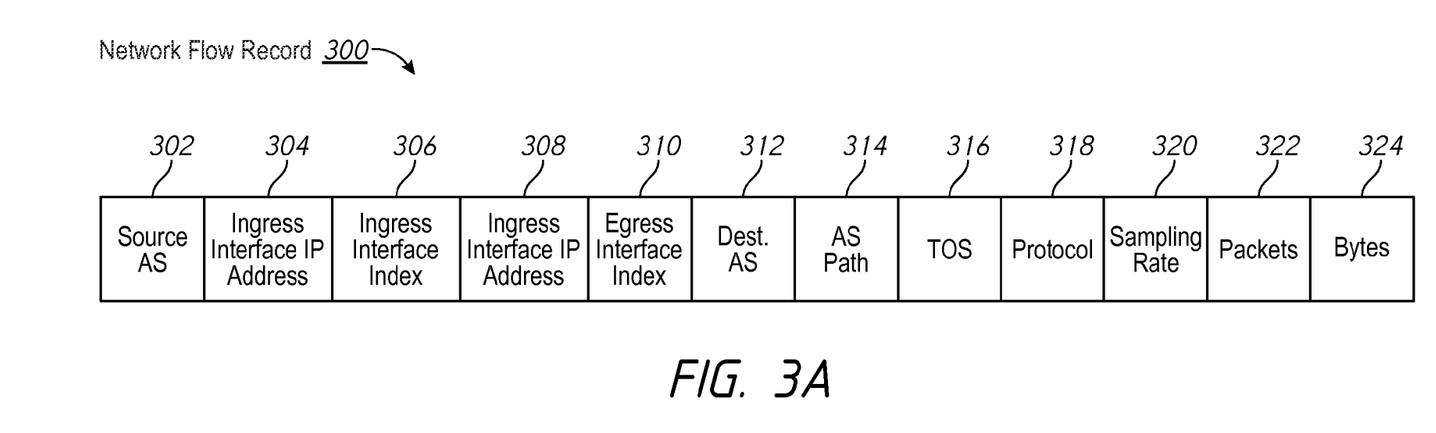
FIG. 3A is a block diagram of an exemplary data structure for a network flow record in accordance with some implementations.

FIG. 3A is a block diagram of an exemplary data structure for a network flow record 300 (sometimes also herein referred to as a "flow record") in accordance with some implementations. In some implementations, with reference to FIG. 2, the network flow record 300 is one of a plurality of network flow records exported to the network controller 110 or a component thereof (e.g., the collector module 222) by a network device 210.

In some implementations, the network flow record 300 comprises a plurality of fields or indicators that characterize a data flow that traverses a network device (e.g., one of the border routers 104 in FIG. 1) within a monitored network (e.g., the AS 102-15 in FIG. 1). As shown in FIG. 3A, the plurality of fields or indicators comprising the network flow record 300 include, but are not limited to, a source AS 302, an ingress interface IP address 304, an ingress interface index 306, an egress interface IP address 308, an egress interface index 310, a destination AS 312, an AS path 314, a type-of-service (TOS) indicator 316, a protocol indicator 318, a sampling rate 320, a total number of packets 322, and/or a total number of bytes 324. In some implementations, the network flow record 300 also comprises a source IP address field, a destination IP address field, a source port indicator, and/or a destination port indicator which are not described herein for the sake of brevity. In some implementations, those of ordinary skill in the art will appreciate from the present disclosure that the network flow record 300 includes a subset of the fields or indicators described herein and/or various other suitable fields or indicators.

In some implementations, the source AS 302 field indicates a number for the AS that corresponds to the source of the data flow. In some implementations, the destination AS 312 field indicates a number for the AS that corresponds to the destination of the data flow. In some implementations, the AS path 314 field identifies a number for the adjacent AS from which the data flow was received, a number for the adjacent AS to which the data flow was sent, and/or the like.

In some implementations, the ingress interface IP address 304 field identifies an IP address associated with the ingress interface by which the data flow entered a monitored network, and the ingress interface index 306 field identifies an SNMP index number associated with the ingress interface by which the data flow entered the monitored network. Similarly, in some implementations, the egress interface IP address 308 field identifies an IP address associated with the egress interface by which the data flow exited the monitored network, and the egress interface index 310 field identifies an SNMP index number associated with the egress interface by which the data flow exited the monitored network.

In some implementations, the TOS indicator 316 identifies the type of service associates with the data flow. For example, the type of service indicator is defined at least in part by the Internet protocol (IP). In some implementations, the protocol indicator 318 identifies the protocol associated with the data flow such as the transmission control protocol (TCP), the user datagram protocol (UDP), the Internet control message protocol (ICMP), or the like. In some implementations, the sampling rate 320 field indicates the rate at which the data flow was sampled by the network device. In some implementations, the total number of packets 322 field indicates the total number of packets associated with the data flow. In some implementations, the total number of bytes 324 field indicates the total number of bytes associated with the data flow.

In some implementations, at least a subset of the fields or indicators of the network flow record 300 correspond to unique sub-keys in a first key space such as the ingress interface IP address 304 field, the ingress interface index 306 field, the egress interface IP address 308 field, and the egress interface index 310 field.

Figure 3B:
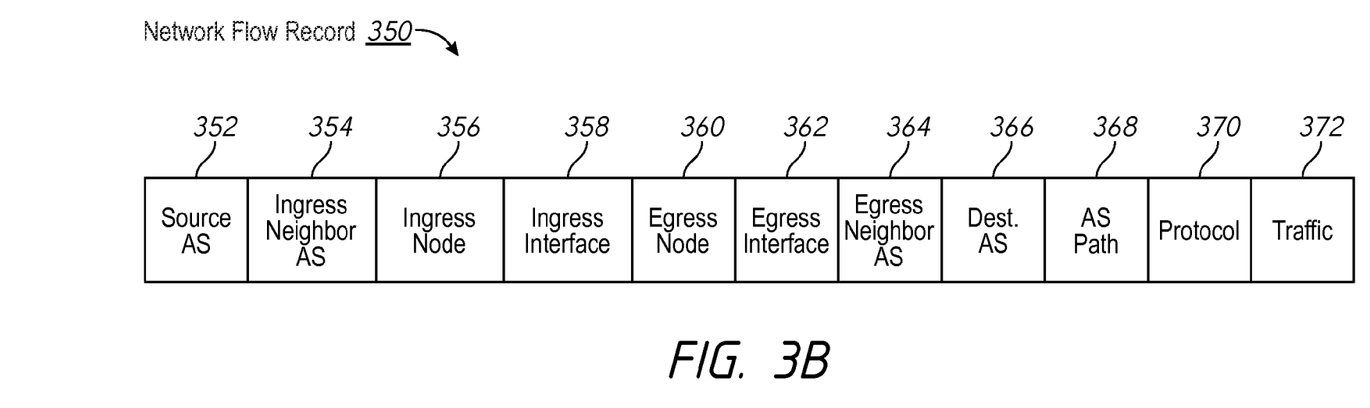
FIG. 3B is a block diagram of an exemplary data structure for an inter-autonomous system (inter-AS) record in accordance with some implementations.

FIG. 3B is a block diagram of an exemplary data structure for an inter-AS record 350 in accordance with some implementations. In some implementations, with reference to FIG. 2, the inter-AS record 350 is produced by the network controller 110 or a component thereof (e.g., the generator module 224) as the result of converting the network flow record 300 into a second key space. The conversion process is described in detail with reference to block 4-3 of FIG. 4. In some implementations, the inter-AS traffic record 350 is one of a plurality of inter-AS traffic records that comprises an inter-AS traffic file produced by the generator module 224 in FIG. 2.

In some implementations, the inter-AS record 350 comprises a plurality of fields or indicators that characterize an inter-AS traffic flow that traverses a monitored network (e.g., the AS 102-15 in FIG. 1). As shown in FIG. 3B, the plurality of fields or indicators comprising the inter-AS record 350 include, but are not limited to, a source AS 352, an ingress neighbor AS 354, an ingress node 356, an ingress interface 358, an egress node 360, an egress interface 362, an egress neighbor AS 364, a destination AS 366, an AS path 368, a protocol indicator 370, and/or a total traffic value 372.

In some implementations, those of ordinary skill in the art will appreciate from the present disclosure that the inter-AS record 350 includes a subset of the fields or indicators described herein and/or various other suitable fields or indicators.

In some implementations, the source AS 352 field indicates a number for the AS that corresponds to the source of the data flow. In some implementations, the ingress neighbor AS 354 field indicates a number for the adjacent AS from which the inter-AS flow entered the monitored network. In some implementations, the egress neighbor AS 364 field indicates a number for the adjacent AS from which the inter-AS flow exited the monitored network. In some implementations, the destination AS 366 field indicates a number for the AS that corresponds to the destination of the data flow. In some implementations, the AS path 368 field identifies numbers for other AS's associated with the inter-AS flow.

In some implementations, the ingress node 356 field identifies a name of the ingress node (e.g., a router name) by which the inter-AS flow entered the monitored network, and the ingress interface 358 field identifies a name of the ingress interface associated with the ingress node 356 by which the inter-AS flow entered the monitored network. In some implementations, the egress node 360 field identifies a name of the egress node (e.g., a router name) by which the inter-AS flow exited the monitored network, and the egress interface 362 field identifies a name of the egress interface associated with the egress node 360 by which the inter-AS flow exited the monitored network.

In some implementations, the protocol indicator 370 identifies the protocol associated with the inter-AS traffic flow such as TCP, UDP, ICMP, or the like. In some implementations, the total traffic value 372 field indicates a measurement of the total traffic corresponding to the inter-AS traffic flow.

In some implementations, at least a subset of the fields or indicators of the inter-AS record 350 correspond to unique sub-keys in a second key space such as the ingress node 356 field, the ingress interface 358 field, egress node 360 field, and the egress interface 362 field.

Figure 4:
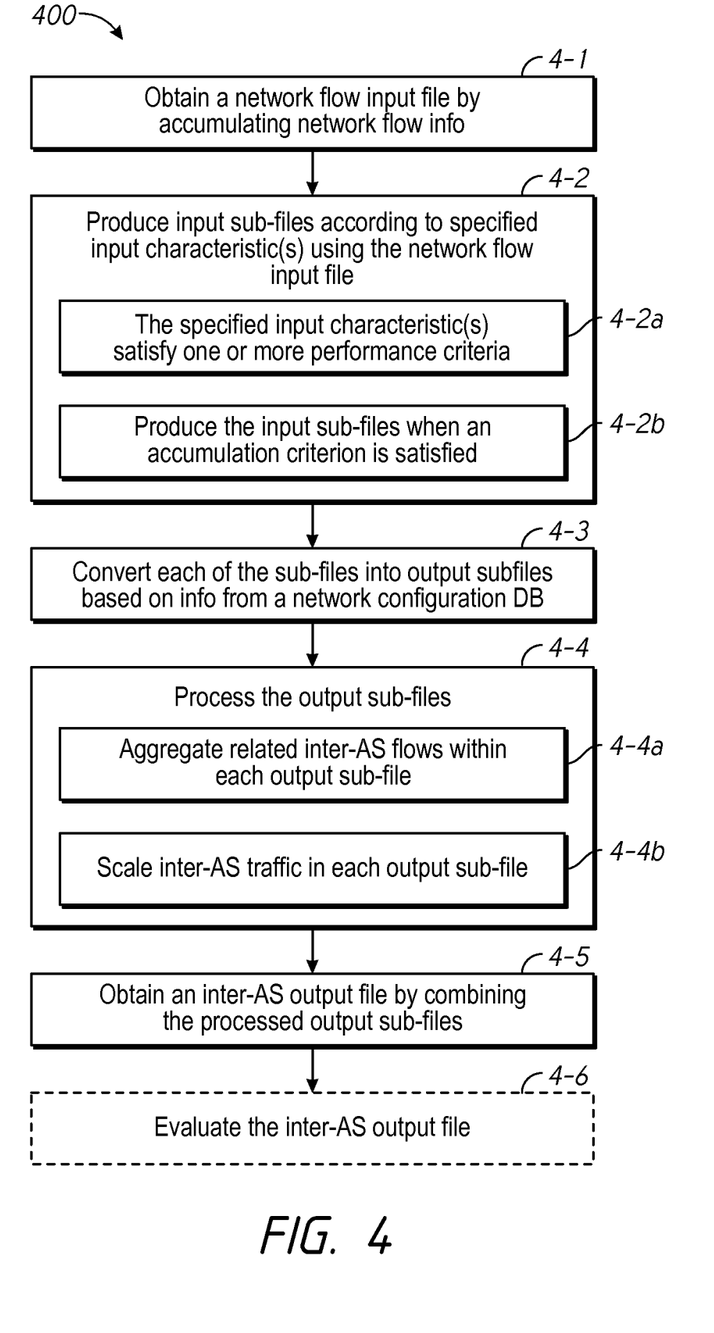
FIG. 4 is a flowchart representation of a method of generating an inter-AS traffic file in accordance with some implementations.

FIG. 4 is a flowchart representation of a method 400 of generating an inter-AS traffic file in accordance with some implementations. In various implementations, the method 400 is performed by a network controller (e.g., the network controller 110 in FIGS. 1-2). Briefly, the method 400 includes obtaining a network flow input file, producing a plurality of input sub-files according to one or more specified network flow characteristics using the network flow input file, converting the plurality of input sub-files to output sub-files, processing the output sub-files, and obtaining an inter-AS output file by combining the plurality of output sub-files.

To that end, as represented by block 4-1, the method 400 includes obtaining a network flow input file by accumulating network flow information. For example, with reference to FIG. 2, the network controller 110 or a component thereof (e.g., the collector module 222) obtains flow records from network devices 210. In some implementations, the network devices 210 periodically export flow records to the network controller 110. In another example, with reference to FIG. 2, the network controller 110 or a component thereof (e.g., the collector module 222) retrieves flow records from network devices 210 (e.g., every Y minutes).

As represented by block 4-2, the method 400 includes producing a plurality of input sub-files (sometimes also herein referred to as "network flow sub-files") according to one or more specified network flow characteristics using the network flow input file. With reference to FIG. 2, for example, the network controller 110 or a component thereof (e.g., the generator module 224) divides the network flow input file into a plurality of network flow sub-files according to one or more specified network flow characteristics (sometimes also herein referred to as "sub-keys" or "key fields"). In one example, the one or more specified network flow characteristics correspond to a tuple defined by {ingress IP address, ingress interface index}. As such, in this example, each network flow sub-file includes one or more data flows with a same ingress IP address and ingress interface index. In another example, the one or more specified network flow characteristics correspond to a tuple defined by {egress IP address, egress interface index}. As such, in this example, each network flow sub-file includes one or more data flows with a same egress IP address and egress interface index.

With reference to FIG. 2, for example, the network controller 110 or a component thereof (e.g., the generator module 224) produces a hash number for each flow record in the network flow input file based the its values for the one or more specified network flow characteristics and then computes a number modulo 10 k. Continuing with this example, any flow record that computes the same number goes into the same network flow sub-file. As such, each of the plurality of network flow sub-files includes one or more data flows with a shared set of values for the one or more network flow characteristics.

In some implementations, as represented by block 4-2a, the one or more specified network flow characteristics satisfy one or more performance criteria. In some implementations, the one or more specified network flow characteristics are bijective. As such, a one-to-one correlation exists between the network flow sub-files and the inter-AS traffic sub-files. In other words, the one or more specified network flow characteristics form a bijective set between the first and second key spaces. In some implementations, the first and second key spaces are disjoint. In some implementations, the first and second key spaces are at least partially disjoint.

In some implementations, the one or more performance criteria are satisfied when an estimated size of the inter-AS traffic file increases at a rate less than a threshold growth rate based on the size of the network flow information. In some implementations, the one or more performance criteria are satisfied when there is a network flow sub-file for each interface of the monitored network (e.g., the AS 102-15 in FIG. 1). For example, with reference to FIG. 1, there is at least one bijective pair of sub-keys that produces a network flow sub-file for each of the interfaces of the border routers 104 of the AS 102-15. In some implementations, the one or more performance criteria are satisfied when an estimated size of the inter-AS traffic file is less than a threshold size. For example, the network controller 110 has 10 GB of RAM to store the inter-AS traffic file. In this example, the one or more specified network flow characteristics are selected such that the estimated size of the inter-AS traffic file is less than 10 GB.

In some implementations, as represented by block 4-2b, the plurality of input sub-files are produced when an accumulation criterion is satisfied. With reference to FIG. 2, for example, the network controller 110 or a component thereof (e.g., the generator module 224) accumulates network flow information until the accumulation criterion is satisfied and subsequently produces the plurality of input sub-files. For example, the accumulation criterion is satisfied when an accumulation duration elapses (e.g., the network flow information is accumulated for 15 minutes). In another example, the accumulation criterion is satisfied when an initiation command is received from a requestor (e.g., an operator of the AS 102-15 or another process). In yet another example, the accumulation criterion is satisfied when a threshold number of network flow records are received. In yet another example, the accumulation criterion is satisfied when the total size of the accumulated network flow information reaches a threshold size (e.g., 20 GB).

As represented by block 4-3, the method 400 includes converting the plurality of input sub-files to output sub-files (sometimes also herein referred to as "inter-AS traffic sub-files") based on information from a network configuration database. With reference to FIG. 2, for example, the network controller 110 or a component thereof (e.g., the generator module 224) converts the network flow sub-files in parallel to inter-AS traffic sub-files. For example, the inter-AS sub-files are stored in separate memory spaces (e.g., durable memory).

In some implementations, the plurality of network flow sub-files are converted to the second key space based on pre-existing information that at least relates the monitored network (e.g., the AS 102-15 in FIG. 1) to a plurality of AS's connected to the monitored network (e.g., the AS's 102-1, 102-2, 102-11, 102-12, 102-21, 102-22, 102-31, 102-32, . . . in FIG. 1). For example, with reference to FIG. 2, network controller 110 or a component thereof (e.g., the generator module 224) converts the network flow sub-files to inter-AS traffic sub-files using information from the network configuration database 115. In some implementations, the specified network flow characteristics are sub-key(s) in the first key space that are selected such that they transform to sub-key(s) in the second key space based on information regarding the monitored network and a plurality of external networks (sometimes also herein referred to as external AS's) connected to the monitored network.

In some implementations, the pre-existing information (e.g., stored in the network configuration database 115 in FIGS. 1-2) includes internal information associated with the monitored network (e.g., acquired via SNMP or another protocol) and external information associated with the plurality of AS's connected to the monitored network (e.g., acquired via BGP or another protocol). In some implementations, the network configuration database 115 stores internal information about the monitored network (e.g., the AS 102-15 in FIG. 1) such as interface names, IP addresses used by the interfaces, routers names, and topology. In some implementations, the network configuration database 115 also stores external information about peer autonomous systems (AS's) (e.g., the AS's 102-1, 102-2, 102-11, 102-12, 102-21, 102-22, 102-31, 102-32, . . . in FIG. 1) such as IP addresses of the peer AS's. For example, the network controller 110 updates the network configuration database 115 according to a predefined schedule (e.g., every 15 minutes).

As represented by block 4-4, the method 400 includes processing the output sub-files. With reference to FIG. 2, for example, the network controller 110 or a component thereof (e.g., the generator module 224) processes inter-AS traffic sub-files in parallel.

In some implementations, as represented by block 4-4a, processing the output sub-files includes aggregating related inter-AS flows within each of the plurality of output sub-files. With reference to FIG. 2, for example, the network controller 110 or a component thereof (e.g., the generator module 224) produces aggregated traffic values for inter-AS flows that are associated with a particular inter-AS path for each of the inter-AS traffic sub-files by summing traffic values for inter-AS flows that share a sequence of at least two external AS's. For example, the generator module 224 sums traffic between an AS source and an AS destination. In other example, the generator module 224 sums traffic that follows a path characterized by an AS source, an AS ingress neighbor, an AS egress neighbor, and an AS destination.

In some implementations, as represented by block 4-4b, processing the output sub-files includes scaling inter-AS traffic within each of the plurality of output sub-files. With reference to FIG. 2, for example, the network controller 110 or a component thereof (e.g., the generator module 224) scales the aggregated traffic values within each of the inter-AS traffic sub-files by multiplying the aggregated traffic values by a ratio characterized by the relationship between a first per-interface traffic metric produced from the inter-AS flows and a second per-interface traffic metric produced from reference traffic information. In some implementations, the reference traffic information is characterized by the total SNMP traffic for a specific interface. For example, the generator module 224 scales each of the aggregated traffic values within an inter-AS traffic sub-file by a ratio characterized by the total network flow traffic for an interface (e.g., a sum of the traffic measurements in an inter-AS traffic sub-file) versus the total SNMP traffic for the interface.

As represented by block 4-5, the method 400 includes obtaining an inter-AS output file by combining the plurality of output sub-files. For example, with reference to FIG. 2, the network controller 110 or a component thereof (e.g., the generator module 224) combines the plurality of inter-AS traffic sub-files by concatenating of the plurality of inter-AS traffic sub-files. For example, the plurality of inter-AS traffic sub-files are concatenated from most to least amount of traffic or vice versa. In another example, the plurality of inter-AS traffic sub-files are concatenated based on router or interface name. Those of ordinary skill in the art will appreciate from the present disclosure that the inter-AS traffic sub-files are combined according to various other suitable ways in other embodiments.

In some implementations, as represented by block 4-6, the method 400 includes evaluating the inter-AS output file. For example, with reference to FIG. 2, the network controller 110 or a component thereof (e.g., the evaluator module 230) evaluates the inter-AS traffic file according to predefined analysis criteria. For example, the inter-AS traffic file is analyzed according to a predefined algorithm or filter criteria and provided to the operator of the monitored network (e.g., the AS 102-15 in FIG. 1). In another example, the inter-AS traffic file is analyzed according to a predefined algorithm or filter criteria and provided to another network analysis process. In yet another example, the inter-AS traffic file is analyzed according to a predefined algorithm or filter criteria and displayed. In yet another example, the inter-AS traffic file is analyzed according to a predefined algorithm or filter criteria and stored for future access.

Figure 5A:
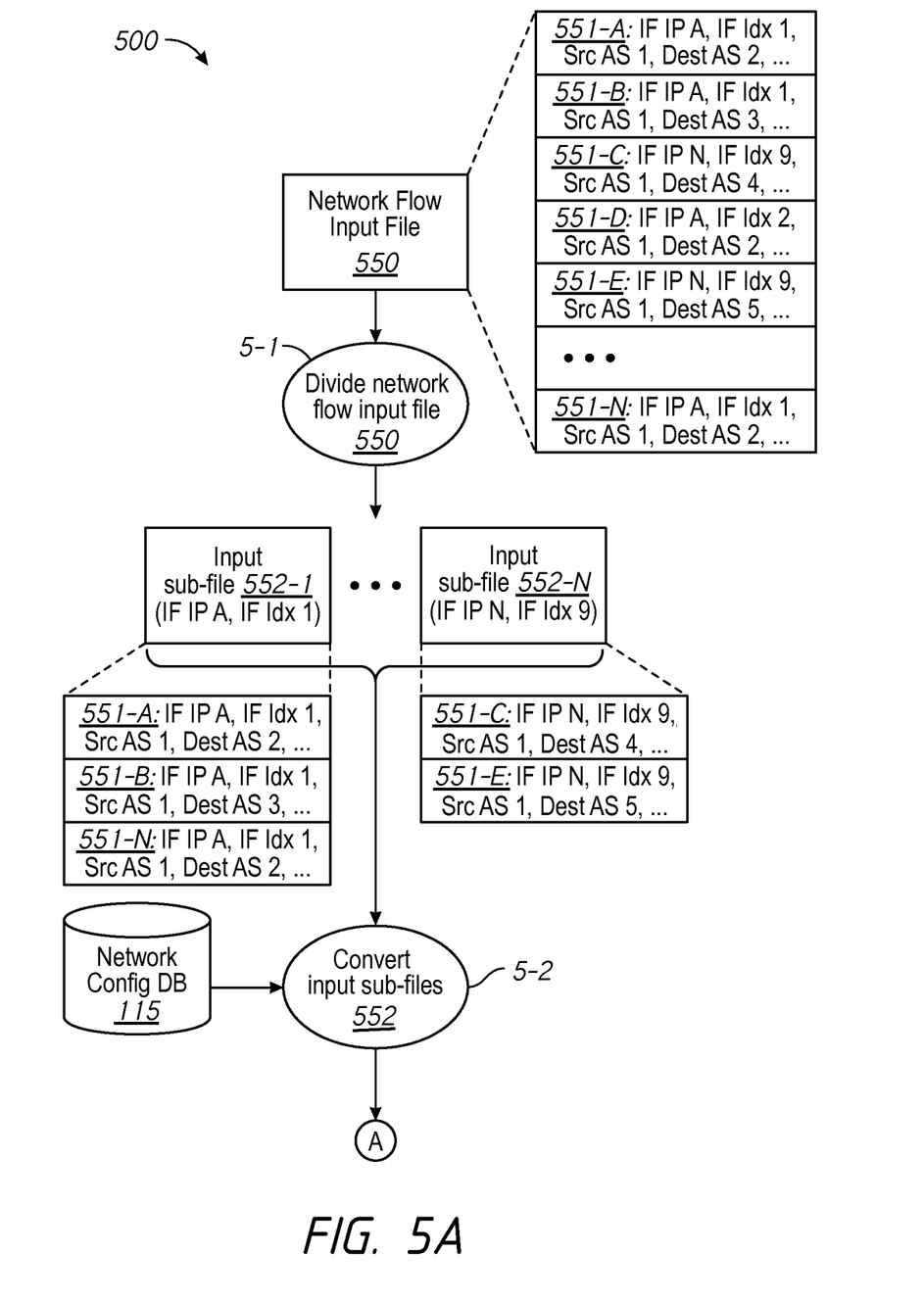
FIGS. 5A-5B show a schematic representation of a simplified method of generating an inter-AS traffic file in accordance with some implementations.
Figure 5B:
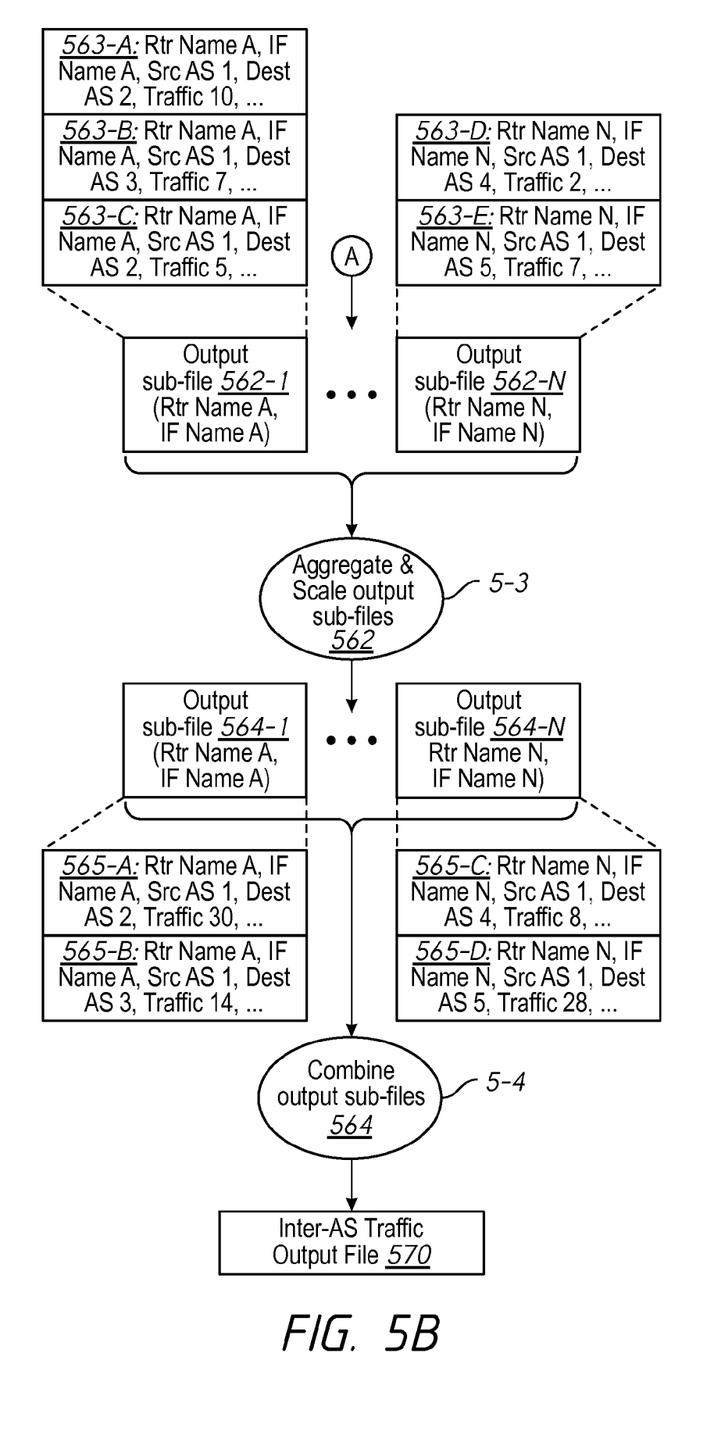

FIGS. 5A-5B show a schematic representation of a simplified method 500 of generating an inter-AS traffic file in accordance with some implementations. In various implementations, the method 500 is performed by a network controller (e.g., the network controller 110 in FIGS. 1-2). Briefly, the method 500 includes dividing a network flow input file 550 into input sub-files 552, converting the input sub-files 552 into output sub-files 562, producing output sub-files 564 by aggregating and scaling the output sub-files 562, and combining the output sub-files 564 to produce an inter-AS traffic output file 570.

As shown in FIG. 5A, the network flow input file 550 comprises a plurality of flow records 551-A, . . . , 551-N. Each of the flow records 551 is at least defined by the following key fields: interface IP address (e.g., IF IP A for flow record 551-A), interface index number (e.g., IF Idx 1 for flow record 551-A), source AS number (e.g., Src AS 1 for flow record 551-A), and destination AS number (e.g., Dest AS 2 for flow record 551-A). For example, the aforementioned key fields form at least a portion of the first key space.

As represented by block 5-1, the method 500 includes dividing the network flow input file 550 according to the tuple defined by the sub-keys {interface IP address, interface index} to produce a plurality of input sub-files 552. As shown in FIG. 5A, the input sub-file 552-1 includes flow records 551-A, 551-B, and 551-N each of which are associated with interface IP address A and interface index number 1. Similarly, the input sub-file 552-N includes flow records 551-C and 552-E each of which are associated with interface IP address N and interface index number 9.

As represented by block 5-2, the method 500 includes converting the plurality of input sub-files 552 into a plurality of output sub-files 562 using information from the network configuration database 115. For example, the plurality of input sub-files 552 are converted from the first key space (e.g., associated with the sub-keys of flow records 551) to a second key space (e.g., associated with the sub-keys of inter-AS records 563) using information stored in the network configuration database 115 to produce the plurality of output sub-files 562.

As shown in FIG. 5B, a plurality of inter-AS records 563 comprise each of the output sub-files 562-1, . . . , 562-N. Each of the inter-AS records 563 is at least defined by the following key fields: router name (e.g., Rtr Name A for inter-AS record 563-A), interface name (e.g., IF Name A for inter-AS record 563-A), source AS number (e.g., Src AS 1 for inter-AS record 563-A), destination AS number (e.g., Dest AS 2 for inter-AS record 563-A), and a traffic indicator (e.g., 10 for inter-AS record 563-A). For example, the aforementioned key fields form at least a portion of the second key space.

As represented by block 5-3, the method 500 includes aggregating and scaling the plurality of output sub-files 562 to produce a plurality of processed output sub-files 564. For example, with reference to output sub-file 562-1, inter-AS records 563-A and 563-C are aggregated because inter-AS records 563-A and 563-C are associated with a same AS path (e.g., from Src AS 1 to Dest AS 2). Continuing with this example, the sum of the traffic in inter-AS records 563-A, 563-B, and 563-C (e.g., 22) for the particular interface defined by the tuple {Rtr Name A, IF name A} is compared to the total SNMP traffic for the interface (e.g., 44). As such, the aggregated traffic values associated with the output sub-file 562-1 are scaled by a factor of 2. In another example, with reference to output sub-file 562-N, the sum of the traffic in inter-AS records 563-D and 563-E (e.g., 9) for the particular interface defined by the tuple {Rtr Name N, IF name N} is compared to the total SNMP traffic for the interface (e.g., 36). As such, the traffic values associated with the output sub-file 562-N are scaled by a factor of 4.

As shown in FIG. 5B, the processed output sub-file 564-1 includes inter-AS record 565-A, which is an aggregated and scaled version of inter-AS records 563-A and 563-C, and inter-AS record 565-B, which is a scaled version of inter-AS record 563-B. For example, the traffic value associated with inter-AS record 565-A (e.g., 30) is the sum of the traffic values in inter-AS records 563-A and 563-C (e.g., 15) multiplied by a scaling factor of 2. Similarly, as shown in FIG. 5B, the processed output sub-file 564-N includes inter-AS record 565-C, which is a scaled version of inter-AS record 563-D, and inter-AS record 565-D, which is a scaled version of inter-AS record 563-E. For example, the traffic value associated with inter-AS record 565-D (e.g., 28) is the traffic value in inter-AS record 563-E (e.g., 7) multiplied by a scaling factor of 4.

As represented by block 5-4, the method 500 includes combining the plurality of output sub-files 564 to produce an inter-AS traffic output file 570. For example, the plurality of output sub-files 564 are concatenated from most to least amount of traffic or vice versa to produce the inter-AS traffic output file 570. In another example, the plurality of output sub-files 564 are concatenated based on router or interface name to produce the inter-AS traffic output file 570.

Figure 6:
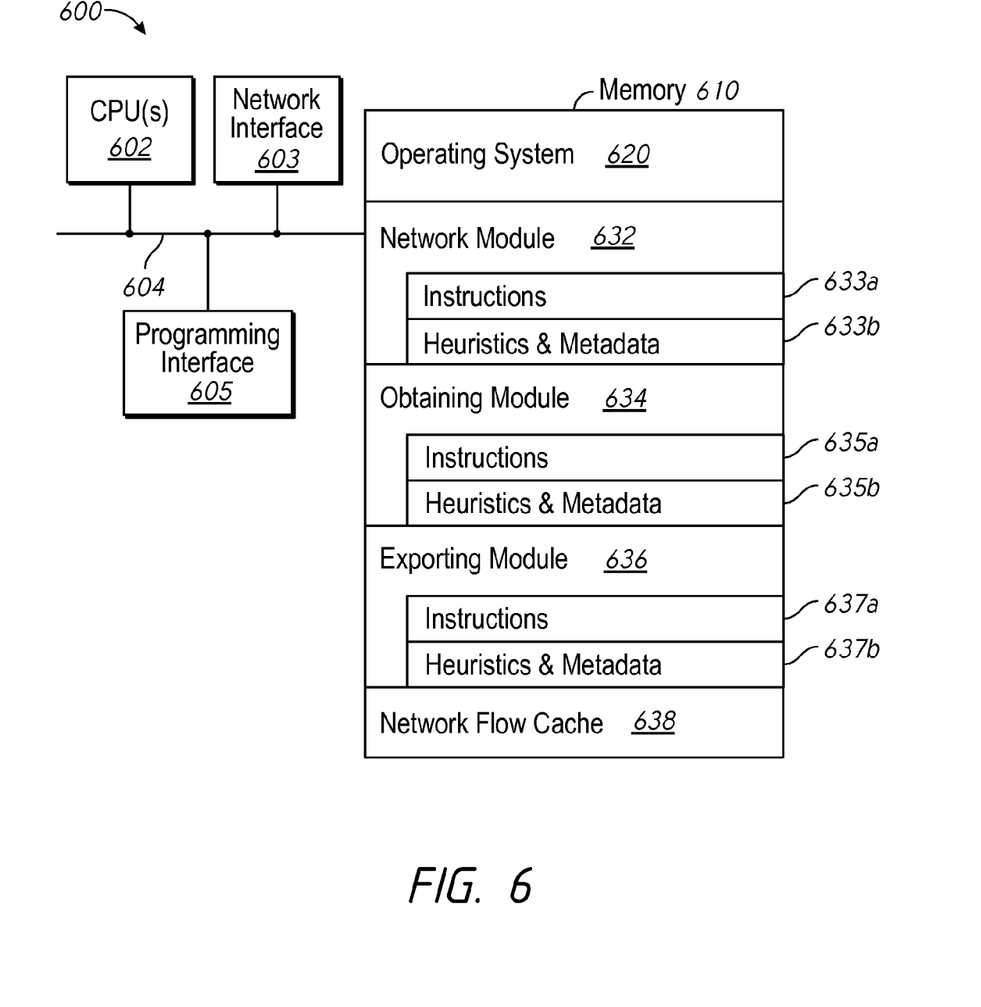
FIG. 6 is a block diagram of an example of a network device in accordance with some implementations.

FIG. 6 is a block diagram of an example of a network device 600 configured in accordance with some implementations. For example, in some implementations, the endpoint device 600 is similar to and adapted from the network device 210-A in FIG. 2. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the endpoint device 600 includes one or more processing units (CPU's) 602, a network interface 603, a memory 610, a programming (I/O) interface 605, and one or more communication buses 604 for interconnecting these and various other components.

In some implementations, the one or more communication buses 604 include circuitry that interconnects and controls communications between system components. In some implementations, the memory 610 includes high-speed random access memory, such as DRAM, SRAM, DDR RAM or other random access solid state memory devices. In some implementations, the memory 610 includes non-volatile memory, such as one or more magnetic disk storage devices, optical disk storage devices, flash memory devices, or other non-volatile solid state storage devices. The memory 610 optionally includes one or more storage devices remotely located from the CPU(s) 602. The memory 610 comprises a non-transitory computer readable storage medium. In some implementations, the memory 610 or the non-transitory computer readable storage medium of the memory 610 stores the following programs, modules and data structures, or a subset thereof including an optional operating system 620, a network module 632, an obtaining module 634, an exporting module 636, and a network flow cache 638.

The operating system 620 includes procedures for handling various basic system services and for performing hardware dependent tasks.

In some implementations, the network module 632 is configured to provide networking capabilities such as packet routing and/or switching. To that end, in various implementations, the network module 632 includes instructions and/or logic 633a, and heuristics and metadata 633b.

In some implementations, the obtaining module 634 is configured to collect network flow information for data flows that traverse the network device 600 and maintain flow entries in the network flow cache 638. To that end, in various implementations, the obtaining module 634 includes instructions and/or logic 635a, and heuristics and metadata 635b. In some implementations, the obtaining module 634 is similar to and adapted from the network flow obtaining module 212 in FIG. 2. In some implementations, the network flow cache 638 is configured to store a plurality of flow entries corresponding to data flows that traversed or are traversing the network device 600.

In some implementations, the exporting module 636 is configured to periodically export flow records stored in the network flow cache buffer 638 to a network controller (e.g., the network controller 110 in FIGS. 1-2). To that end, in various implementations, the exporting module 636 includes instructions and/or logic 637a, and heuristics and metadata 637b. In some implementations, the exporting module 636 is similar to and adapted from the network flow exporting module 216 in FIG. 2.

Although the network module 632, the obtaining module 634, and the exporting module 636 are illustrated as residing on a single device (i.e., the network device 600), it should be understood that in other implementations, any combination of the network module 632, the traffic collection module 634, and the exporting module 636 reside in separate computing devices. For example, each of the network module 632, the obtaining module 634, and the exporting module 636 reside on a separate device.

Moreover, FIG. 6 is intended more as functional description of the various features are present in a particular embodiment as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 7:
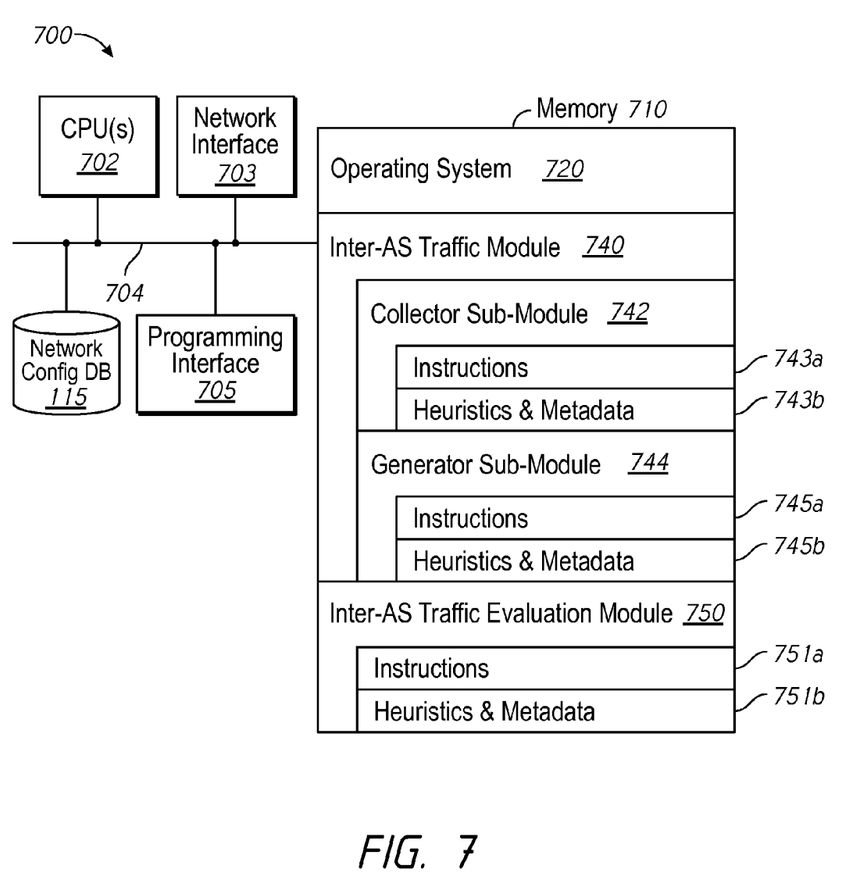
FIG. 7 is a block diagram of an example of a network controller in accordance with some implementations.

FIG. 7 is a block diagram of an example of a network controller 700 in accordance with some implementations. For example, in some implementations, the network controller 700 is similar to and adapted from the network controller 110 in FIGS. 1-2. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the network controller 700 includes one or more processing units (CPU's) 702, a network interface 703, a memory 710, a programming (I/O) interface 705, a network configuration database 115, and one or more communication buses 704 for interconnecting these and various other components.

In some implementations, the one or more communication buses 704 include circuitry that interconnects and controls communications between system components. The network configuration database 115 stores internal information related to a network (e.g., the AS 102-15 in FIG. 1) that is monitored by the network controller 700 and external information related to other external networks that are connected to said network.

The memory 710 includes high-speed random access memory, such as DRAM, SRAM, DDR RAM or other random access solid state memory devices. In some implementations, the memory 710 includes non-volatile memory, such as one or more magnetic disk storage devices, optical disk storage devices, flash memory devices, or other non-volatile solid state storage devices. The memory 710 optionally includes one or more storage devices remotely located from the CPU(s) 702. The memory 710 comprises a non-transitory computer readable storage medium. In some implementations, the memory 710 or the non-transitory computer readable storage medium of the memory 710 stores the following programs, modules and data structures, or a subset thereof including an optional operating system 720, an inter-AS traffic module 740, and an inter-AS traffic evaluation module 750.

The operating system 720 includes procedures for handling various basic system services and for performing hardware dependent tasks.

In some implementations, the inter-AS traffic module 740 is configured to generate an inter-AS traffic file based on collected network flow information. In some implementations, the inter-AS traffic module 740 includes a collector sub-module 742 and a generator sub-module 744.

In some implementations, the collector sub-module 742 is configured to collect network flow information from network devices within the network (e.g., the AS 102-15 in FIG. 1) that is monitored by the network controller 700. To that end, in various implementations, the collector sub-module 742 includes instructions and/or logic 743a, and heuristics and metadata 743b. In some implementations, the collector sub-module 742 is similar to and adapted from the collector module 222 (FIG. 2) which is discussed in further detail with reference to FIG. 4.

In some implementations, the generator sub-module 744 is configured to generate an inter-AS traffic file based on the network flow information collected by the collector sub-module 742 and also information from the network configuration database 115. To that end, in various implementations, the generator sub-module 744 includes instructions and/or logic 745a, and heuristics and metadata 745b. In some implementations, the generator sub-module 744 is similar to and adapted from the generator module 224 (FIG. 2) which is discussed in further detail with reference to FIG. 4.

In some implementations, the inter-AS traffic evaluation module 750 is configured to evaluate the inter-AS traffic file produced by the generator sub-module 744. To that end, in various implementations, the inter-AS traffic evaluation module 750 includes instructions and/or logic 751a, and heuristics and metadata 751b. In some implementations, the inter-AS traffic evaluation module 750 is similar to and adapted from the evaluator module 230 (FIG. 2) which is discussed in further detail with reference to FIG. 4.

Although the inter-AS traffic module 740 and the inter-AS traffic evaluation module 750 are illustrated as residing on a single device (i.e., the network controller 700), it should be understood that in other implementations, any combination of the inter-AS traffic module 740 and the inter-AS traffic evaluation module 750 reside in separate computing devices. For example, each of the inter-AS traffic module 740 and the inter-AS traffic evaluation module 750 reside on a separate device.

Moreover, FIG. 7 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one embodiment to another and, in some implementations, may depend in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
obtaining, at a network controller, network flow information from a plurality of devices in a network, wherein the network flow information from a respective device of the plurality of devices corresponds to one or more data flows that traverse the respective device;

producing a plurality of network flow sub-files according to one or more specified network flow characteristics that characterize a first keyspace using the network flow information, wherein the one or more specified network flow characteristics satisfy one or more performance criteria;

generating a plurality of inter-autonomous system (inter-AS) traffic sub-files by converting the plurality of network flow sub-files to a second keyspace distinct from the first keyspace, wherein each of the plurality of inter-AS traffic sub-files includes one or more inter-AS flows that characterize data traffic between at least two external AS's that traverses the network; and generating an inter-AS traffic file based on the plurality of inter AS-traffic sub-files in order to monitor traffic traversing the network.

2. The method of claim 1, wherein each of the plurality of network flow sub-files includes one or more data flows with a shared set of values for the one or more network flow characteristics.

3. The method of claim 1, wherein the one or more performance criteria are satisfied when an estimated size of the inter-AS traffic file increases at a rate less than a threshold growth rate based on the size of the network flow information.

4. The method of claim 1, wherein the one or more performance criteria are satisfied when there is a network flow sub-file for each interface of the network.

5. The method of claim 1, wherein the one or more performance criteria are satisfied when an estimated size of the inter-AS traffic file is less than a threshold size.

6. The method of claim 1, wherein the one or more performance criteria are satisfied when an estimated total number of network flow sub-files is less than a threshold number of sub-files.

7. The method of claim 1, wherein each of the one or more specified network flow characteristics is one of an ingress interface IP address, an egress interface IP address, an ingress interface index indicator, an egress interface index indicator, a source IP address, a destination IP address, a source AS indicator, a destination AS indicator, a source port, or a destination port.

8. The method of claim 1, further comprising:
for each of the inter-AS traffic sub-files, producing aggregated traffic values for inter-AS flows that are associated with a particular inter-AS path by summing traffic values for inter-AS flows that share a sequence of at least two external AS's.

9. The method of claim 8, further comprising:
for each of the inter-AS traffic sub-files, scaling the aggregated traffic values by multiplying the aggregated traffic values by a ratio characterized by the relationship between a first per-interface traffic metric produced from the inter-AS flows and a second per-interface traffic metric produced from reference traffic information.

10. The method of claim 1, wherein converting the plurality of network flow sub-files to the second keyspace comprises:
converting the plurality of network flow sub-files to the second keyspace based on pre-existing information that at least relates the network to a plurality of AS's connected to the network.

11. The method of claim 10, wherein the pre-existing information includes internal information associated with the network and external information associated with the plurality of AS's connected to the network.

12. The method of claim 1, wherein producing the plurality of network flow sub-files comprises:
producing the plurality of network flow sub-files in accordance with a determination that the network flow information satisfies an accumulation criterion.

13. The method of claim 1, wherein generating the output inter-AS traffic file comprises:
combining the plurality of inter-AS traffic sub-files as a concatenation of the plurality of inter-AS traffic sub-files.

14. The method of claim 1, wherein the plurality of devices are routers of the network.

15. A device comprising:
a memory; and
a processor coupled to the memory that executes program instructions stored in the memory, wherein the program instructions stored in the memory includes:
a collector module configured to obtain network flow information from a plurality of devices in a network, wherein the network flow information from a respective device of the plurality of devices corresponds to one or more data flows that traverse the respective device;
a network flow partitioning module configured to produce a plurality of network flow sub-files according to one or more specified network flow characteristics that characterize a first keyspace using the network flow information, wherein the one or more specified network flow characteristics satisfy one or more performance criteria; and
an inter-AS generation module configured to:
generate a plurality of inter-autonomous system (inter-AS) traffic sub-files by converting the plurality of network flow sub-files to a second keyspace distinct from the first keyspace, wherein each of the plurality of inter-AS traffic sub-files includes one or more inter-AS flows that characterize data traffic between at least two external AS's that traverses the network; and
generate an inter-AS traffic file based on the plurality of inter AS-traffic sub-files in order to monitor traffic traversing the network.

16. The device of claim 15, further comprising:
a network configuration database including internal information associated with the network and external information associated with a plurality of AS's connected to the network.

17. The device of claim 16, wherein the inter-AS generation module is configured to convert the plurality of network flow sub-files to the second keyspace based on information from the network configuration database that at least relates the network to a plurality of AS's connected to the network.

18. The device of claim 15, wherein the one or more performance criteria are satisfied when an estimated size of the inter-AS traffic file increases at a rate less than a threshold growth rate based on the size of the network flow information.

19. The device of claim 15, wherein the one or more performance criteria are satisfied when an estimated size of the inter-AS traffic file is less than a threshold size.

20. A device comprising:
means for obtaining network flow information from a plurality of devices in a network, wherein the network flow information from a respective device of the plurality of devices corresponds to one or more data flows that traverse the respective device;

means for producing a plurality of network flow sub-files according to one or more specified network flow characteristics that characterize a first keyspace using the network flow information, wherein the one or more specified network flow characteristics satisfy one or more performance criteria;

means for generating a plurality of inter-autonomous system (inter-AS) traffic sub-files by converting the plurality of network flow sub-files to a second keyspace distinct from the first keyspace, wherein each of the plurality of inter-AS traffic sub-files includes one or more inter-AS flows that characterize data traffic between at least two external AS's that traverses the network; and means for generating an inter-AS traffic file based on the plurality of inter AS-traffic sub-files in order to monitor traffic traversing the network.

* * * * *